US008699062B2

(12) United States Patent
Shiba et al.

(10) Patent No.: US 8,699,062 B2
(45) Date of Patent: Apr. 15, 2014

(54) PRINTER SYSTEM CONTROL METHOD, PRINTER SYSTEM, AND PRINTER

(75) Inventors: Seiji Shiba, Nagano-ken (JP); Atsushi Takagi, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 718 days.

(21) Appl. No.: 12/976,249

(22) Filed: Dec. 22, 2010

(65) Prior Publication Data

US 2011/0176165 A1     Jul. 21, 2011

(30) Foreign Application Priority Data

Jan. 18, 2010   (JP) .................................. 2010-007881

(51) Int. Cl.
G06F 3/12     (2006.01)
(52) U.S. Cl.
USPC .......................................... 358/1.15; 358/1.1
(58) Field of Classification Search
USPC .................................................. 358/1.15, 1.1
See application file for complete search history.

(56) References Cited

U.S. PATENT DOCUMENTS

| 6,906,815 B1 | 6/2005 | Miyake et al. |
| 2005/0200880 A1 | 9/2005 | Oshiumi et al. |
| 2006/0221391 A1* | 10/2006 | Okazawa et al. ............ 358/1.15 |
| 2007/0008577 A1 | 1/2007 | Matsuura et al. |
| 2011/0249293 A1* | 10/2011 | Nakaota ...................... 358/1.15 |

FOREIGN PATENT DOCUMENTS

| CN | 1841303 A | 10/2006 |
| EP | 1223043 A1 | 7/2002 |
| JP | 2000-062301 | 2/2000 |
| JP | 2006-185322 | 7/2006 |
| JP | 2008-055766 | 3/2008 |
| JP | 2009-083387 | 4/2009 |

* cited by examiner

Primary Examiner — King Poon
Assistant Examiner — Iriana Cruz (57) ABSTRACT

A printer system enables detecting completion of printing a print job on a printer from the computer side without increasing the number of communication transactions between the printer and computer. In a printer system 1 having a computer 2 connected to a plurality of printers 4, each time a printer 4 completes printing a print job (step ST11), the number of completed print jobs is counted and stored as a print job completion count (step ST12 to step ST16). When a status data request is received from the computer 2 to get status data indicating the operating state of the printer 4, the print job completion count is sent together with the status data to the computer 2 (step ST17, step ST18). Based on the newly received print job completion count and the previously received print job completion count, the computer 2 detects the print job execution status.

6 Claims, 4 Drawing Sheets

PRINTER SYSTEM CONTROL METHOD, PRINTER SYSTEM, AND PRINTER

CROSS-REFERENCE TO RELATED APPLICATION(S)

Japanese Patent Application No. 2010-007881, filed Jan. 18, 2010, is hereby incorporated by reference in its entirety.

BACKGROUND

1. Field of Invention

The present invention relates to a printer system that includes a computer and a printer connected to the computer through a network or other channel, and a control method for the printer system enabling the computer to detect print jobs that have been completed (finished) on the printer. The invention also relates to a printer that enables the computer to easily detect print jobs that have been completed on the printer.

2. Description of Related Art

Printer systems that have a computer and one or more printers connected through a network, and are configured so that the computer acquires the operating status of each printer at a regular interval in order to ensure the reliability and operating status (working status) of the printer system, are known from the literature. In such a printer system, the computer sends a status data request to each printer at a regular interval in order to acquire status data indicating the operating status of each printer, and each printer that receives the status data request gets and returns status data indicating its own operating state to the computer. The printers return information about the operating state of the printer, such as a print state indicating a print job is being executed, a standby state indicating a print job is not being executed, and error states that occur when, for example, the ink runs out, as the status data.

The status data is information that is acquired at the moment the printer determines its own operating status in response to the status data request. As a result, if a status data request is sent from the computer immediately after the computer sends a print job to the printer, the printer returns status data indicating a standby state in response to this status data request, and the computer receives this status data report, it is difficult for the computer to detect if the reported standby state represents a standby state following completion of the print job that was just sent, or a standby state preceding the start of the print job.

In order for the computer to know if a print job sent to the printer has already been completed or has not yet been started, the computer could conceivably identify the individual print jobs and query the printer about the status of a particular print job. For example, with the printer system taught in Japanese Unexamined Patent Appl. Pub. JP-A-2009-83387, an ID value is assigned to each print job, and the computer can use the ID value to query the printer about the status of a particular print job. When such a query is received, the printer references a print job history that is updated and stored each time a print job is executed to get and send the status of the print job identified by the ID value to the computer.

When the computer must individually identify print jobs and query a printer to know if a particular print job sent to a printer has been completed, the number of transactions and communications between the computer and printers increases, and the load on the computer, printers, and network increases.

SUMMARY OF INVENTION

A print job control method and printer system according to the invention enable a computer to detect the completion of a print job on a printer without increasing the number of transactions or communications between the computer and the printers. A printer according to the invention enables a computer to easily know if a print job has been completed by the printer.

A first aspect of the invention is a control method for a printer system having a printer and a computer communicably connected, including steps of: the printer counting the number of completed print jobs as a print job completion count each time printing a print job including a coupon print job related to a specific product sent (commanded) from the computer is completed; the printer sending status data indicating a state of the printer and including the print job completion count to the computer when a status data request is received from the computer; and the computer detecting a specific print job that finished printing on the printer by comparing the print job completion count received from the printer with the print job completion count that was previously received.

When the printer in this aspect of the invention receives a status data request from the computer, the printer sends the number of print jobs including coupon print jobs related to specific products that finished printing on the printer as a print job completion count to the computer. For example, the print job completion count is sent with status information such as how much ink remains and other printer state information that is sent regularly. The printer prints the print jobs in the order received from the computer.

Therefore, by comparing and determining the difference between the currently received print job completion count and the previously received print job completion count on the computer, how many print jobs were completed, whether or not the most recent print job finished printing, or what range of print jobs finished printing between when the last status data was received and the new status data was received can be detected. Because the computer can detect the status of a print job without individually identifying the print jobs and querying the printer for each print job, the number of communication transactions between the computer and the printer is not increased to know if printing a print job finished. As a result, the load on the computer, each printer, and the network can be reduced.

In order to detect completion of printing a specific print job on the printer from the computer, the control method for a printer system according to another aspect of the invention preferably has steps of the computer counting the number of print jobs sent to the printer as a print job command count each time a print job is sent to the printer, and detecting a specific print job that finished printing on the printer by comparing the print job completion count received from the printer and the print job command count.

Further preferably, the print job includes at least a first print job that accomplishes specific printing, and a second print job that accomplishes specific printing different from the first print job; the print job command count includes at least a first print job command count that is incremented each time the first print job is sent, and a second print job command count that is incremented each time the second print job is sent; and the print job completion count includes at least a first print job completion count that is incremented each time printing the first print job ends, and a second print job completion count that is incremented each time printing the second print job ends.

This aspect of the invention enables separately detecting the completion of printing a first print job and completion of printing a second print job that prints differently than the first print job. As a result, completion of printing a specific first print job selected from among a plurality of first print jobs, and completion of printing a specific second print job selected from among a plurality of second print jobs, can be quickly detected.

Further preferably, the first print job is for test printing to determine if printing normally on the printer is possible. Because the computer can thus quickly detect completion of test printing a coupon on the printer, print jobs that cannot be sent to the printer for printing unless test printing is completed can be executed without delay.

Another aspect of the invention is a printer system including at least one printer and a computer communicably connected to the printer. More particularly, the printer includes a communication unit that communicates with the computer, a print control unit that executes print jobs including a coupon print job related to specific product information received from the computer, a storage unit that stores a number of print jobs that finished printing as a print job completion count, and a status management unit that, when printing a print job is completed by the print control unit, increments the print job completion count and updates the storage unit to the new print job completion count after the count is incremented. The communication unit references the storage unit and sending status data indicating a state of the printer and including the print job completion count to the computer when a status data request is received from the computer. The computer includes a print job completion count storage unit that stores the received print job completion count, and a status detection unit that, when the print job completion count is received, compares the received print job completion count with the print job completion count already stored in the print job completion count storage unit and detects a specific print job that finished printing on the printer, and updates the print job completion count storage unit to the received print job completion count.

In this aspect of the invention the printer has a status detection unit that stores the number of print jobs including coupon print jobs related to specific product information that finished printing on the printer as a print job completion count in a storage unit, and when a status data request is received from the computer, a communication unit sends the print job completion count to the computer. For example, the print job completion count is sent together with other printer status information, such as the remaining ink level. The printer prints the print jobs in the order received from the computer. Therefore, by comparing and determining the difference between the newly received print job completion count and the previously received print job completion count stored in the print job completion count storage unit on the computer, whether printing a specific print job finished between when the last status data was received and the new status data was received can be detected based on the difference. Because the computer can detect the status of a print job without individually identifying the print jobs and querying the printer for each print job, the number of communication transactions between the computer and the printer is not increased to know if printing a print job finished.

Further preferably in another aspect of the invention, the computer includes a print job command counting unit that counts the number of sent print jobs as a print job command count each time a print job is sent to the printer; and the status detection unit compares the print job completion count received from the printer with the print job command count, and detects a specific print job that finished printing on the printer.

Further preferably in this aspect of the invention, the print job includes at least a first print job that accomplishes specific printing, and a second print job that accomplishes specific printing different from the first print job; the storage unit of the printer includes at least a first storage unit that stores a number of first print jobs that finished printing as a first print job completion count, and a second storage unit that stores a number of second print jobs that finished printing as a second print job completion count; the status management unit of the printer includes an evaluation unit that determines at least if the print job that finished printing in the print control unit is the first print job or the second print job, and an update unit that increments the first print job completion count and updates the first storage unit to the incremented new first print job completion count when a first print job is identified, and increments the second print job completion count and updates the second storage unit to the incremented new second print job completion count when a second print job is identified; the communication unit references at least the first storage unit and second storage unit, and sends status data including the first print job completion count and second print job completion count to the computer, when a status data request is received from the computer; the print job command counting unit counts at least the number of sent first print jobs as a first print job command count each time a first print job is sent, and counts the number of sent second print jobs as a second print job command count each time a second print job is sent; and the status detection unit compares at least the first print job completion count and the first print job command count to detect first print jobs that finished printing on the printer, and compares at least the second print job completion count and the second print job command count to detect second print jobs that finished printing on the printer. Because completion of a first print job and completion of a second print job can be separately detected in this aspect of the invention, completion of printing a specific first print job selected from among a plurality of first print jobs, and completion of printing a specific second print job selected from among a plurality of second print jobs, can be quickly detected.

Further preferably, the first print job is for test printing a specific test pattern to determine, for example, if printing normally on the printer is possible. Because the computer can thus quickly detect completion of test printing on the printer, print jobs that cannot be sent to the printer for printing unless test printing is completed can be executed without delay.

Another aspect of the invention is a printer including: a communication unit that can communicate with a computer; a print unit that prints on paper; a print control unit that executes print jobs including a coupon print job related to specific product information received from the computer; a storage unit that stores a number of print jobs that finished printing as a print job completion count; and a status management unit that, when printing a print job is completed by the print control unit, increments the print job completion count and updates the storage unit to the new print job completion count after the count is incremented; wherein the communication unit references the storage unit and sends status data indicating a state of the printer and including the print job completion count to the computer when a status data request is received from the computer.

With this aspect of the invention, the printer sends a print job completion count, which is the number of print jobs that finished printing on the printer, in response to a status data request from the computer. For example, the print job completion count is sent together with other printer status information, such as the remaining ink level. The computer side can therefore detect the print jobs that the printer finished printing at the time the printer acquired the status data.

Preferably, the printer also has a cutter unit that cuts the paper. The print control unit cutting the paper by the cutter unit based on a cut command contained in the print job; and the storage unit counting completion of cutting the paper as completion of printing the print job to increment the print job completion count.

Execution of the cut command can be interpreted as completing execution of the print job, and thus enables easily incrementing the print job completion count.

Further preferably in a printer according to another aspect of the invention, the print job includes at least a first print job that accomplishes specific printing, and a second print job that accomplishes specific printing different from the first print job; and the print job completion count includes at least a first print job completion count that is incremented each time printing the first print job ends, and a second print job completion count that is incremented each time printing the second print job ends.

Because completion of the first print job and completion of the second print job can be separately detected in this aspect of the invention, completion of printing a specific first print job selected from among a plurality of first print jobs, and completion of printing a specific second print job selected from among a plurality of second print jobs, can be quickly detected.

Yet further preferably in a printer according to another aspect of the invention, the first print job accomplishes test printing.

Because the computer in this aspect of the invention can thus quickly detect completion of test printing on the printer, print jobs that cannot be sent to the printer for printing unless test printing is completed can be executed without delay.

In another aspect of the invention, a tangible, non-transitory computer-readable media embodying instructions executable by a computer is provided, the media having instructions that cause a computer to execute the methods set forth in the preceding paragraphs.

Effect of the Invention

When a status data request is received by a printer from a computer in a printer system according to an aspect of the invention, the printer sends the number of print jobs that finished printing on the printer to the computer as a print job completion count. As a result, the computer can compare the newly received print job completion count with the previously received print job completion count to determine the difference therebetween, and based on this difference detect if printing a print job was completed in the time between when the previous status data was acquired and the current status data was acquired. Because the computer can determine the status of a print job without individually identifying the print job and separately querying the printer, completion of printing a print job can be detected without increasing the number of transactions between the computer and the printer.

Other objects and attainments together with a fuller understanding of the invention will become apparent and appreciated by referring to the following description and claims taken in conjunction with the accompanying drawings.

DESCRIPTION OF THE PREFERRED EMBODIMENTS

Preferred embodiments of a printer system, printer system control method, and printer according to the present invention are described below with reference to the accompanying figures.

Printer System

Figure 1:
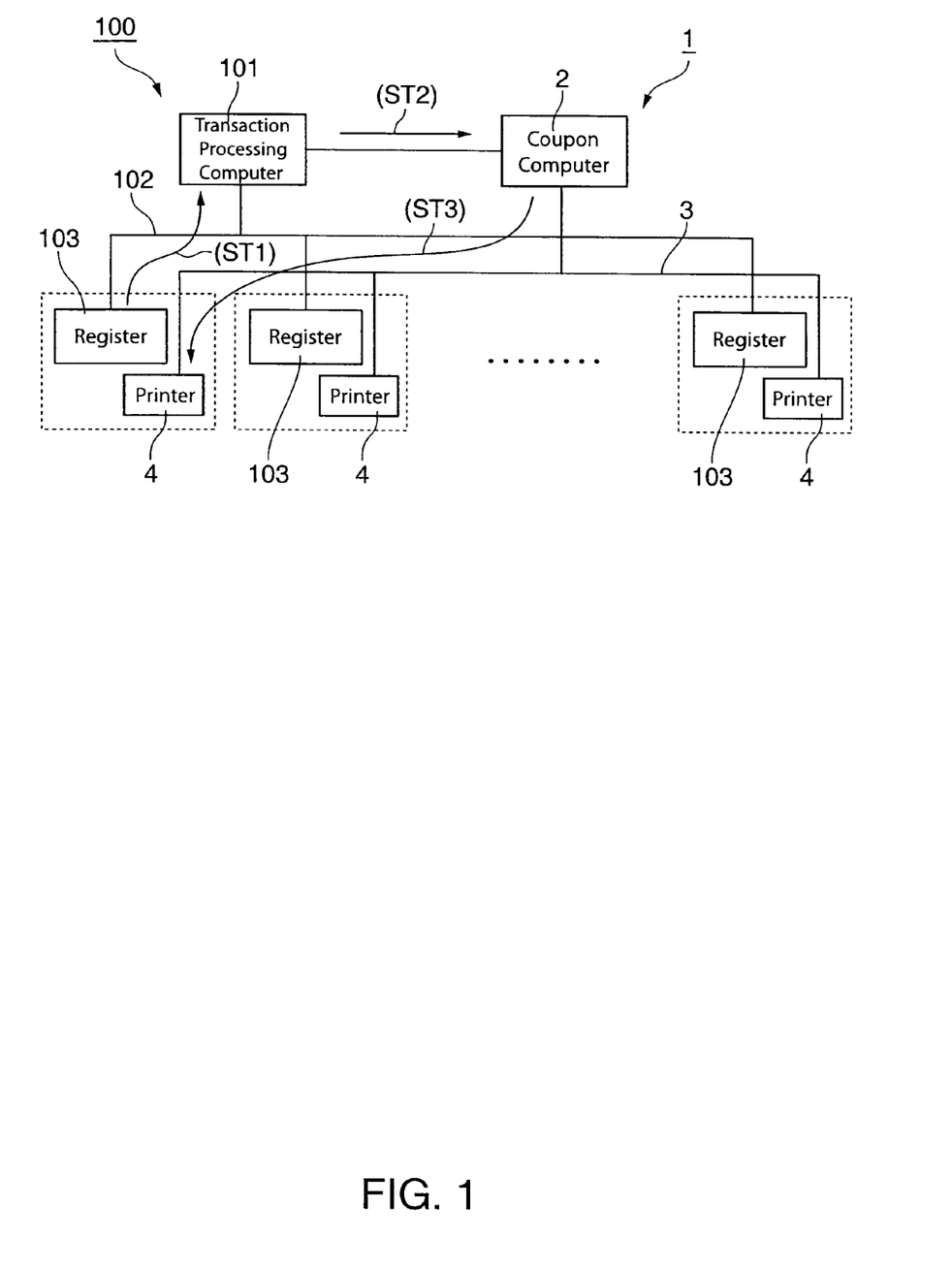
FIG. 1 schematically illustrates the configuration of a printer system according to a first embodiment of the invention.

FIG. 1 is a block diagram of a printer system. This embodiment of the invention describes a printer system 1 for printing coupons that is added to a POS system 100 such as used in a supermarket for issuing coupons.

The POS system 100 includes a computer for sales transaction processing 101 ("transaction processing computer" below) and a plurality of POS registers 103 connected through a network 102 such as a LAN to the transaction processing computer 101.

The printer system 1 includes a computer for issuing coupons 2 ("coupon computer" below) and a plurality of printers 4 for printing coupons that are paired to the POS registers 103 and are connected to the coupon computer 2 through a LAN or other network 3. The transaction processing computer 101 and the coupon computer 2 are communicably connected.

In the POS system 100, when a product code is input from a connected barcode scanner and sale information is sent through a POS register 103 to the transaction processing computer 101 (shown as step ST1 in FIG. 1), the transaction processing computer 101 sends information about the products in the sale information to the coupon computer 2 (step ST2).

In the printer system 1, if information about a specific product is contained in the sale information that the coupon computer 2 received from the transaction processing computer 101, a coupon is printed by the printer 4 that is paired to the POS register 103 that sent the information to the transaction processing computer 101 (step ST3). Each of the plural coupon printers 4 is identically configured, and executes the same process with the coupon computer 2.

Alternatively, the POS system 100 can be configured so that the coupon computer 2 gets the sale information through the transaction processing computer 101, and acquires only the sale information that requires issuing a coupon from the received sale information. In addition to using information about specific products, coupon data could also be sent to the printer 4 and a coupon issued when a particular coupon issuing condition is met, such as the sale total reaching a specific amount. The coupon issuing conditions can be freely determined by the coupon computer 2 side.

Computer

Figure 2:
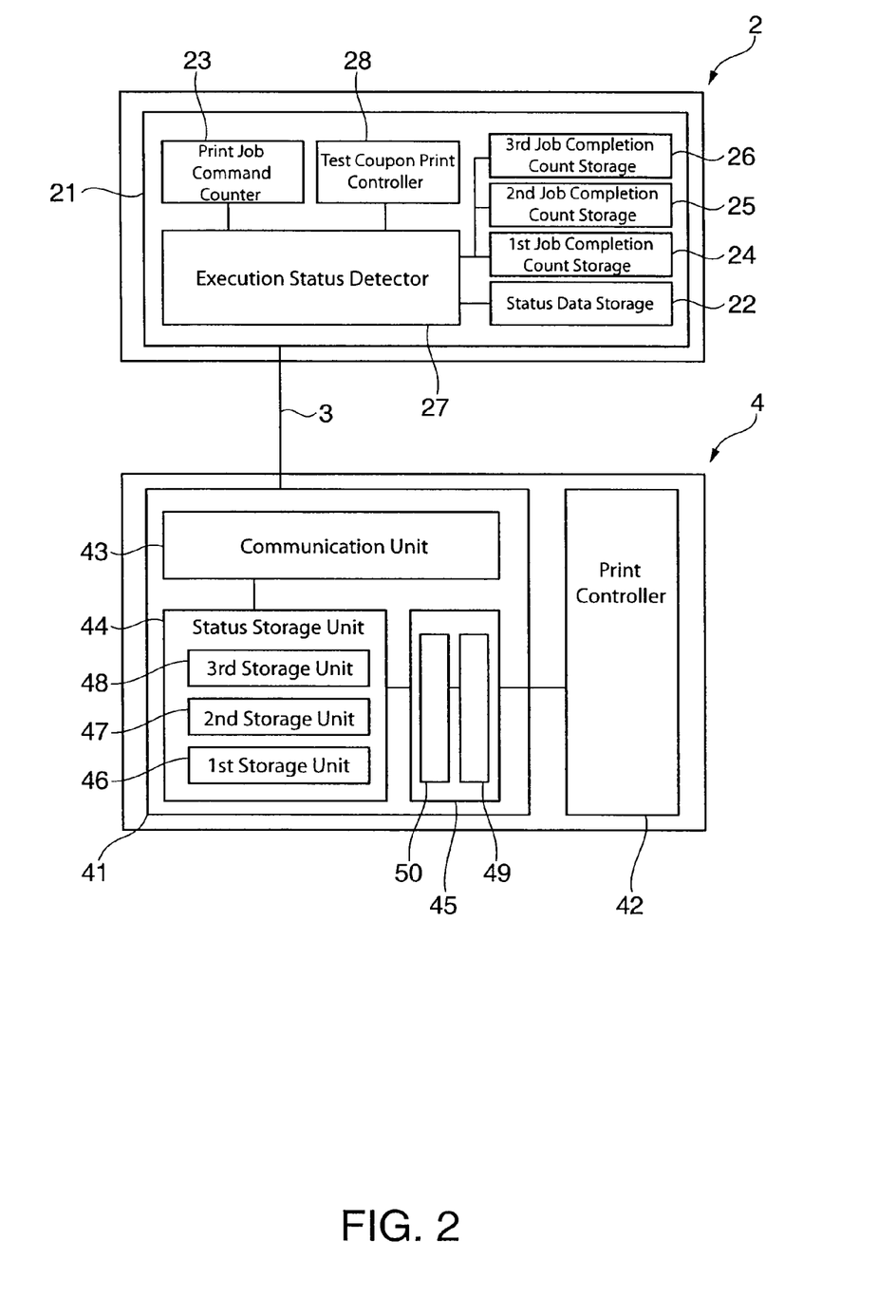
FIG. 2 is a block diagram showing the control system of the printer system shown in FIG. 1.

FIG. 2 is a schematic block diagram showing the control system of the printer system. The coupon computer 2 is constructed around a control unit 21 including a CPU, RAM, and ROM (omitted from the figure for clarity).

When the control unit 21 detects specific product information in the product information received from the transaction processing computer 101, it sends a coupon print job for issuing a coupon to the printer 4 paired with the POS register 103 that received the information. If a cut command is added to the end of the print job, the paper is cut by a cutter after the printer 4 finishes printing the print job, and a receipt can be issued. Note that in addition to the specific products, the conditions for issuing coupons can be freely configured on the coupon computer 2.

When the printer 4 is an inkjet printer, for example, the control unit 21 also sends a status sheet print job for executing a print test to the printer 4 as necessary or at a regular interval. This print test prints a status sheet (a test pattern causing ink to be discharged from all nozzles so that it can be easily seen if there are any missing dots from any nozzle) for determining if normal printing is possible, that is, if printing without missing dots caused by clogged nozzles is possible. The status sheet print jobs include a first status sheet print job that executes a coupon print job to print a coupon for test printing after printing the status sheet ends, and a second status sheet print job that prints only the status sheet. This enables first determining if a coupon can be printed normally, issuing coupons if normal printing is possible, and prompting the operator to start a nozzle cleaning operation if normal printing is not possible.

To assure the reliability of the printer system 1, the control unit 21 also detects the operating state of the printer 4 at a regular interval. More specifically, the control unit 21 sends a status data request that requests status data indicating the operating state of the printer 4 to the printer 4 at a regular interval, receives the status data sent from the printer 4 in response to this status data request, and determines the operating state of the printer 4. More specifically, the control unit 21 has a status data storage unit 22 for storing the status data received from the printer 4, and updates the status data storage unit 22 every time status data is received from the printer 4.

In this embodiment of the invention the control unit 21 sends a status data request every 3 seconds. In response to this status data request, the printer 4 sends status data to the computer 2. The status data indicates a printing state when a print job is being executed, a standby state when a print job is not being executed, error states such as when the ink runs out or the paper runs out, and the state of the print unit, such as how much ink remains and how much paper is left. The status data may also include other information about the state of the printer 4, such as if a cover is open. In addition to the status data, the number of first status sheet print jobs, the number of second status sheet print jobs, and the number of coupon print jobs finished (completed) by the printer 4 are also sent to the computer 2 as the first status sheet print job completion count, second status sheet print job completion count, and coupon print job completion count. By thus including print job completion information in the status data that is communicated at a regular interval, an increase in the number of transactions can be prevented.

The control unit 21 also includes a print job command counter 23 that counts the number of print job commands sent to the printer 4, first to third print job completion count storage units 24 to 26 that store the print job completion counts received from the printer 4, an execution status detector 27, and a test coupon print controller 28. The execution status detector 27 detects the execution status of each print job on the printer 4 based on the received print job completion counts. The test coupon print controller 28 waits for the completion of a first status sheet print job on the printer 4 and then instructs the printer 4 to execute a coupon print job to issue a coupon for test printing (also referred to as printing a test coupon). The storage units 22 and 24-26 may be formed as part of the RAM of coupon computer 2. Print job command counter 23, test coupon print controller 28 and execution status detector 27 may be formed as part of the CPU of coupon computer 2 operating under instructions stored in the ROM of coupon computer 2.

Each time a first status sheet print job command is sent to the printer 4, the print job command counter 23 counts the number of print jobs commanded as the first status sheet print job command count. Each time a second status sheet print job command is sent to the printer 4, the print job command counter 23 counts the number of print jobs commanded as the second status sheet print job command count. Similarly, each time a coupon print job is sent to the printer 4, the number of print jobs commanded is counted as the coupon print job command count.

The first to third print job completion count storage units 24 to 26 respectively store the first status sheet print job completion count, the second status sheet print job completion count, and the coupon print job completion count received from the printer 4 with the status data.

The execution status detector 27 detects the execution status of each print job in the period from when the previous status data was received to when new status data is received, and updates the values stored in the first to third print job completion count storage units 24 to 26 to the corresponding print job completion counts received from the printer 4.

More specifically, when the first status sheet print job completion count is received from the printer 4, completion of a first status sheet print job in this period is detected from the difference between this first status sheet print job completion count and the value already stored in the first print job completion count storage unit 24, and updates the first print job completion count storage unit 24 to the first status sheet print job completion count that was received.

When the second status sheet print job completion count is received from the printer 4, completion of a second status sheet print job in this period is detected from the difference between this second status sheet print job completion count and the value already stored in the second print job completion count storage unit 25, and updates the second print job completion count storage unit 25 to the second status sheet print job completion count that was received.

When the coupon print job completion count is received from the printer 4, completion of a coupon print job in this period is detected from the difference between this coupon print job completion count and the value already stored in the third print job completion count storage unit 26, and updates the third print job completion count storage unit 26 to the coupon print job completion count that was received.

The execution status detector 27 detects the execution status of a specific print job on the printer 4.

More specifically, based on the difference between the number of first status sheet print job commands sent to the printer 4 and the first status sheet print job completion count received from the printer 4, the execution status detector 27 knows if a first status sheet print job was completed by the printer 4.

Based on the difference between the number of second status sheet print job commands sent to the printer 4 and the second status sheet print job completion count received from the printer 4, the execution status detector 27 knows if a second status sheet print job was completed by the printer 4.

Similarly, based on the difference between the number of coupon print job commands sent to the printer 4 and the coupon print job completion count received from the printer 4, the execution status detector 27 knows if a coupon print job was completed by the printer 4.

When the execution status detector 27 determines the execution status of each print job in the period between receiving the previous status data and receiving new status data, the test coupon print controller 28 detects if there is a change between the print job completion counts from the printer 4 and the values already stored in the first to third print job completion count storage units 24 to 26 corresponding to those print job completion counts. If a change is detected in the first status sheet print job completion count, the test coupon print controller 28 instructs the printer 4 to execute a coupon print job to print a test coupon.

Printer

The printer 4 is described next with reference to FIG. 2. The printer 4 includes a main control unit 41 that controls the printer 4, and a print controller 42 that controls driving the print unit, including the printhead, to print.

The main control unit 41 includes a communication unit 43 for communicating with the computer 2; a status storage unit 44 for storing status data indicating the operating state of the printer 4; and an execution status manager 45 for managing the number of print jobs completed by the printer 4. The printer 4 also has a cutter device (not shown), and drives the cutter device to cut the paper after printing by the print unit in response to a cut command included at the end of the print job sent from the computer 2. As a result, a specific single coupon can be issued. Completion of cutting the paper by the cutter device can be interpreted as completion of printing the print job.

The status data stored in the status storage unit 44 indicates the printing status, standby status, and error status as described above, and is updated by the main control unit 41 each time the operating state of the printer 4 changes. The status storage unit 44 includes a first storage unit 46 for storing the number of completed first status sheet print jobs as the first status sheet print job completion count, a second storage unit 47 for storing the number of completed second status sheet print jobs as the second status sheet print job completion count, and a third storage unit 48 for storing the number of completed coupon print jobs as the coupon print job completion count.

The execution status manager 45 includes an evaluation unit 49 that, when completion of a print job is reported from the print controller 42, determines if the completed print job was a first status sheet print job, second status sheet print job, or coupon print job; and an updating unit 50 that updates the print job completion counts stored in the first to third storage units 46 to 48 based on the result from the evaluation unit 49.

The evaluation unit 49 identifies the print job based on the command name assigned to each print job command and the type of command.

The updating unit 50 reads and adds 1 to the print job completion count from the first to third storage unit 46 to 48 corresponding to the type of print job identified by the evaluation unit 49, and then updates the first to third storage unit 46 to 48 corresponding to the type of print job identified by the evaluation unit 49 to the resulting sum.

The execution status manager 45 thus identifies the print job after printing a print job is completed by the printer 4, and increments the print job completion count corresponding to the identified print job accordingly. As a result, the print job completion counts are not incremented when, for example, an error occurs and the print job is cancelled by the printer 4, or when a print job is interrupted.

The communication unit 43 references the status storage unit 44 and acquires the status data when a status data request is received from the computer 2. The communication unit 43 also references the first to third print job completion count storage units 24 to 26 and acquires the first status sheet print job completion count, second status sheet print job completion count, and coupon print job completion count. The communication unit 43 then sends the status data and the first status sheet print job completion count, second status sheet print job completion count, and coupon print job completion count to the computer 2.

Print Job Execution Status Detection Operation

Figure 3:
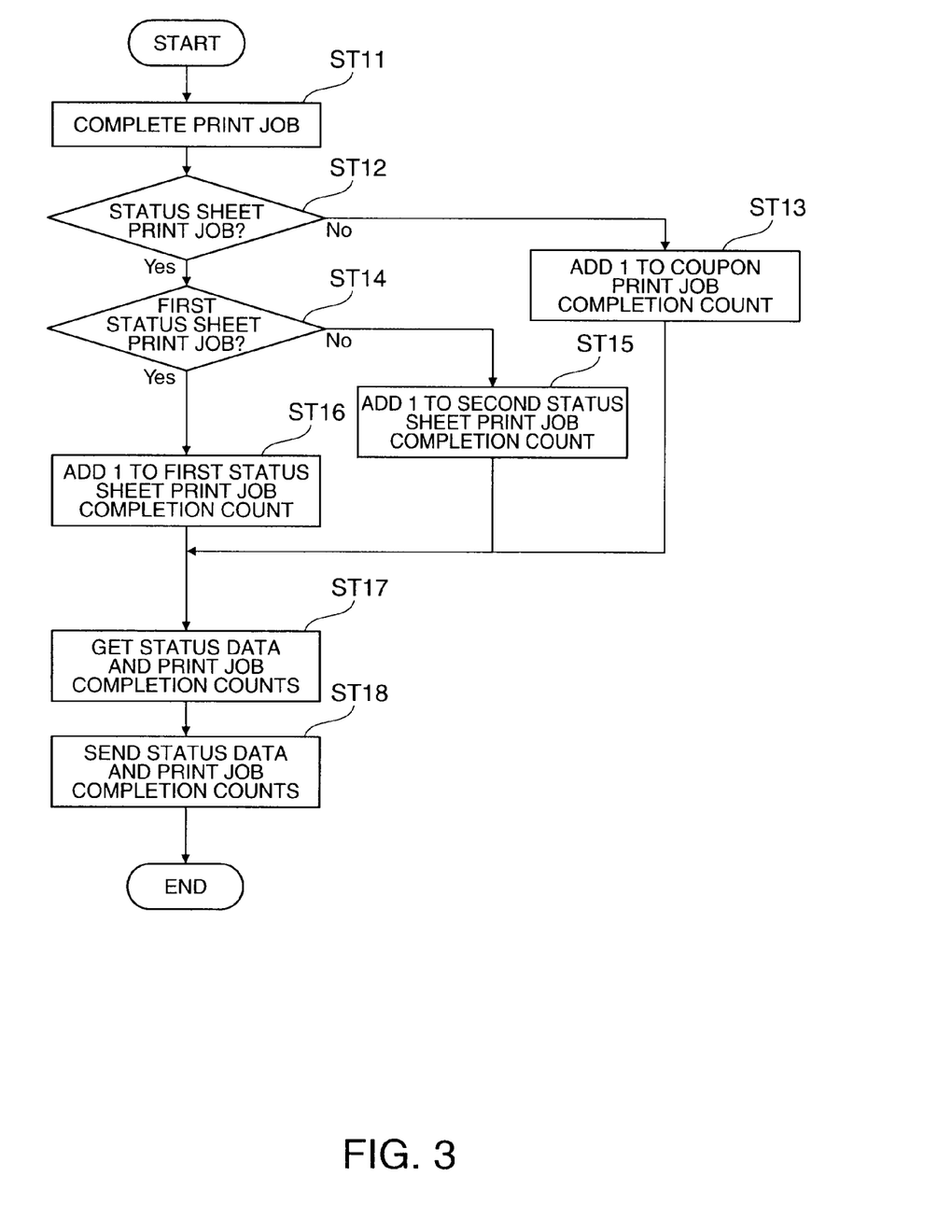
FIG. 3 is a flowchart of the print job execution status management operation of the printer.
Figure 4:
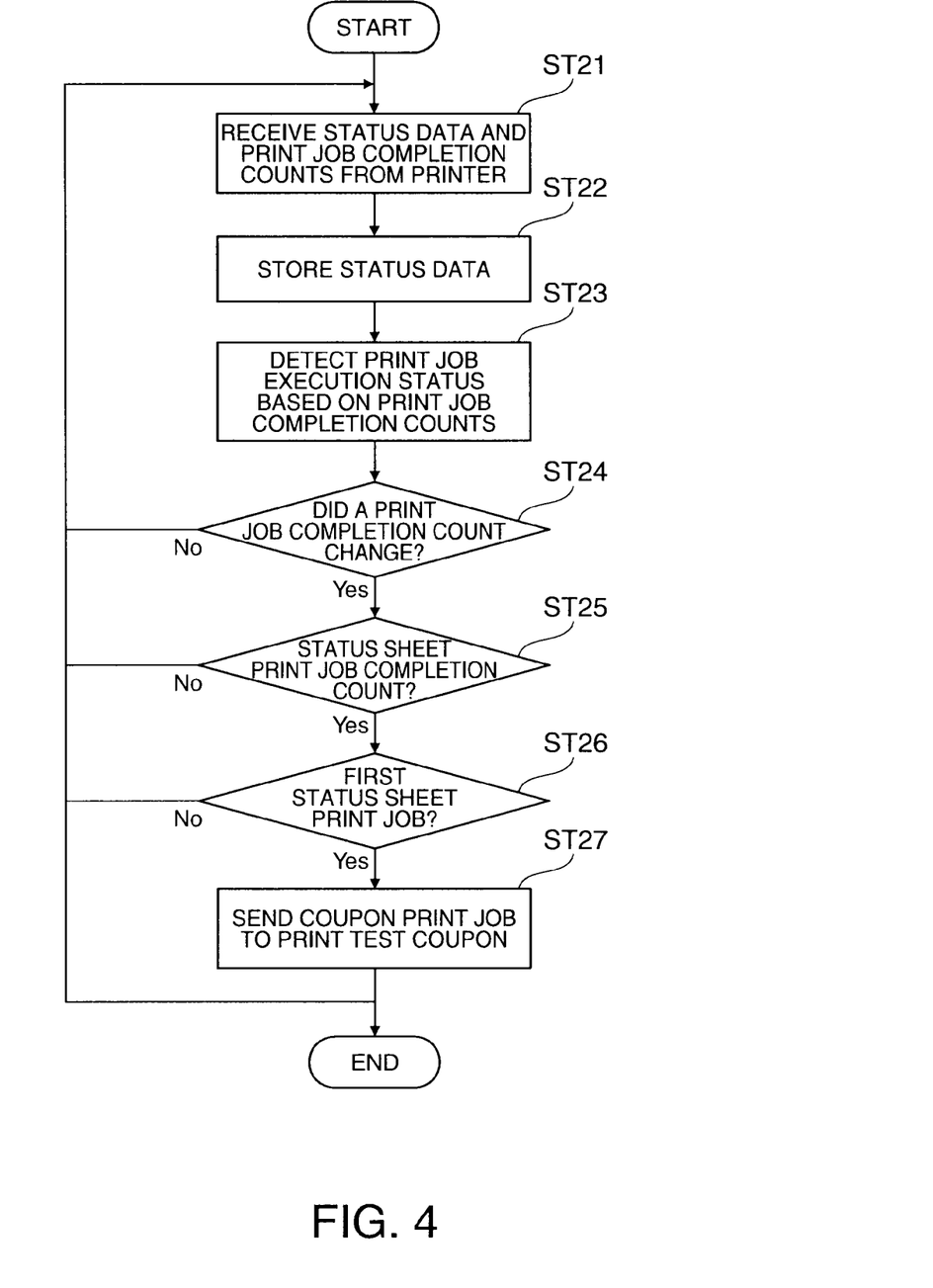
FIG. 4 is a flowchart of the print job execution status detection operation of the computer.

The print job execution status detection operation of the computer 2 is described next with reference to FIG. 3 and FIG. 4. FIG. 3 is a flowchart of the print job execution status management operation of the printer. FIG. 4 is a flowchart of the print job execution status detection operation of the computer.

During initialization, such as when the power is turned on, the print job completion counts of the computer 2, the values stored in the first to third print job completion count storage units 24 to 26, and the values stored in the first to third storage units 46 to 48 of the printer 4 are set to 0.

After initialization is completed, the computer 2 sends a status data request to the printer 4 at a regular interval. In response to the status data request, the printer 4 sends status data, the first status sheet print job completion count, second status sheet print job completion count, and coupon print job completion count to the computer 2.

The computer 2 also instructs the printer 4 to execute a first status sheet print job, second status sheet print job, or coupon print job to print a test coupon as necessary. In addition, the computer 2 instructs the printer 4 to execute a coupon print job when specific product information is contained in the product information received from the transaction processing computer 101, for example. Each time the computer 2 issues one of these print job commands, it increments the print job command count of the particular print job.

This example describes a case in which the computer 2 sends a first status sheet print job to the printer 4 after initialization. When the computer 2 sends a first status sheet print job to the printer 4, the first status sheet print job command count counted by the print job command counter 23 goes to 1.

When the printer 4 receives a first status sheet print job command, a status sheet is printed by the print controller 42 and the printer 4 goes to a print state. As shown in FIG. 3, when the first status sheet print job is completed (step ST11), completion of the print job is reported from the print controller 42 to the execution status manager 45, and the printer 4 goes to the standby state. The execution status manager 45 identifies the completed print job and increments the print job completion count (step ST12 to step ST16).

More specifically, the execution status manager 45 determines if the print job completed in step ST11 was a status sheet print job (step ST12), and if not adds 1 to the coupon print job completion count and stores the result in the third storage unit 48 (step ST13).

If a status sheet print job is identified in step ST12, whether it was a first status sheet print job is determined (step ST14), and if not the second status sheet print job completion count is incremented by 1 and the result is stored in the second storage unit 47 (step ST15).

If a first status sheet print job is detected in step ST14, the first status sheet print job completion count is incremented 1, and the new count is stored in the first storage unit 46 (step ST16).

Because the print job is determined to be a status sheet print job in this example, 1 is added to 0, which is the initial first status sheet print job completion count, in step ST16, and 1 is stored in the first storage unit 46.

If a status data request is received from the computer 2 at this time, the communication unit 43 references the status storage unit 44 and acquires the status data. The communication unit 43 also references the first to third storage units 46 to 48 and acquires the first status sheet print job completion count, second status sheet print job completion count, and coupon print job completion count (step ST17). The communication unit 43 then sends the status data, first status sheet print job completion count, second status sheet print job completion count, and coupon print job completion count to the computer 2 (step ST18).

In this example the printer 4 sends status data indicating the printer is in a standby state, the first status sheet print job completion count (1), second status sheet print job completion count (0), and coupon print job completion count (0) to the computer 2.

Note that if the first status sheet print job is being printed, or the first status sheet print job was paused or cancelled by the printer 4 due to an error, when the communication unit 43 references the first to third storage units 46 to 48, the printer 4 sends status data reporting the operating state, the first status sheet print job completion count (0), second status sheet print job completion count (0) and coupon print job completion count (0) to the computer 2.

Next, as shown in FIG. 4, when the computer 2 receives the status data and print job completion counts from the printer 4 (step ST21), the main control unit 41 updates the status data storage unit 22 to the received status data (step ST22). The execution status detector 27 also detects the execution status of the print jobs on the printer 4 from the received print job completion counts and the values already stored in the first to third print job completion count storage units 24 to 26 (step ST23).

In this example the execution status detector 27 detects that the first status sheet print job was completed in the period between when the previous status data was acquired and the new status data was acquired based on the difference between the first status sheet print job completion count (1) from the printer 4 and the initial value of 0 stored in the first print job completion count storage unit 24. Furthermore, because the first status sheet print job completion count counted by the computer 2 is 1, the execution status detector 27 also determines from the difference with the received first status sheet print job completion count (1) that the most recently instructed first status sheet print job was completed, and updates the first print job completion count storage unit 24 to the received first status sheet print job completion count, that is, 1.

Because there is no difference between the received print job completion counts and values stored in the print job completion count storage units for other print jobs, and there is no difference between the received print job completion counts and the print job command counts, the execution status detector 27 also knows that other print jobs have not been completed. Note that if the computer 2 receives a first status sheet print job completion count of (0), the execution status detector 27 determines from the difference with the initial value (0) in the first print job completion count storage unit 24 that the first status sheet print job has not ended. The execution status detector 27 also determines from the difference with the first status sheet print job command count (1) that the most recently output first status sheet print job has not been completed.

When the execution status detector 27 detects the execution status of each print job in step ST23, the test coupon print controller 28 determines if there is a change between the print job completion counts from the printer 4 and the values already stored in the first to third print job completion count storage units 24 to 26 corresponding to those print job completion counts (step ST24). If a change is detected, the test coupon print controller 28 determines if the change also appears in the status sheet print job completion count (step ST25). If the change appears in the status sheet print job completion count, the test coupon print controller 28 determines if the change appears in the first status sheet print job completion count (step ST26). If in step ST26 the change in the print job completion count is detected in the first status sheet print job completion count, the test coupon print controller 28 tells the printer 4 to execute a coupon print job to print a test coupon (step ST27).

In this example the test coupon print controller 28 instructs the computer 2 to send a coupon print job command to the printer 4 in step ST27. When the computer 2 sends a coupon print job command to the printer 4, the coupon print job command count kept by the print job command counter 23 goes to 1.

If the coupon print job for printing a test coupon is completed on the printer 4 before the printer 4 receives a new status data request, the coupon print job completion count is incremented by the printer 4 (step ST12 and step ST13 in FIG. 3) and stored in the third storage unit 48. As a result, in response to the new status data request, the communication unit 43 sends status data indicating a standby state, the first status sheet print job completion count (1), second status sheet print job completion count (0), and coupon print job completion count (1) to the computer 2 (step ST17 and step ST18 in FIG. 3).

When the computer 2 receives the new status data and print job completion counts from the printer 4 (step ST21 in FIG. 4), the main control unit 41 updates the status data storage unit 22 to the new status data (step ST22 in FIG. 4).

The execution status detector 27 also determines from the difference between the coupon print job completion count (1) from the printer 4 and the initial value (0) in the third print job completion count storage unit 26 that the coupon print job printing a test coupon was completed during the regular interval, and updates the third print job completion count storage unit 26 to the received coupon print job completion count of 1. Furthermore, because the coupon print job completion count counted by the computer 2 is 1, completion of the most recent coupon print job is detected (step ST23 in FIG. 4) from the difference with the first status sheet print job completion count (1) that was received. Because change in the print job completion count does not appear in the status sheet print job completion count at this time (step ST25 in FIG. 4), the test coupon print controller 28 does send a coupon print job for test printing to the printer 4.

A case in which the computer 2 sends three consecutive coupon print jobs to the printer 4 to print coupons corresponding to specific product information after the operation described above is described next.

When the computer 2 sends three coupon print jobs to the printer 4, the coupon print job completion count kept by the print job command counter 23 goes to 4, including the count of the coupon print job command for printing a test coupon.

If two of the coupon print jobs are completed by the printer 4 before the printer 4 receives a new status data request, the coupon print job completion count is increased by 2 (step ST12 and step ST13 in FIG. 3 execute twice). When a new status data request is received, the printer 4 therefore returns status data indicating the current operating state, the first status sheet print job completion count (1), second status sheet print job completion count (0), and coupon print job completion count (3) (step ST17 and step ST18 in FIG. 3).

When the computer 2 then receives the new status data and print job completion counts from the printer 4 (step ST21 in FIG. 4), the main control unit 41 updates the status data storage unit 22 to the received status data (step ST22 in FIG. 4). The execution status detector 27 also detects the completion of two coupon print jobs in the regular interval from the difference between the coupon print job completion count (3) received from the printer 4 and the value (1) already stored in the third print job completion count storage unit 26. In addition, because the coupon print job completion count kept by the computer 2 is 4, the execution status detector 27 knows from the difference with the coupon print job completion count (3) that the most recently sent coupon print job is not completed (step ST23 in FIG. 4). Because the change in the print job completion count does not appear in the status sheet print job completion count at this time (step ST25 in FIG. 4), the test coupon print controller 28 does not send a coupon print job for test printing to the printer 4.

Note that if the computer 2 sends a second status sheet print job command to print a status sheet to the printer 4 while a coupon print job for issuing a coupon corresponding to specific product information is being executed, the execution status detector 27 of the computer 2 can detect completion of the second status sheet print job in the period between when the last status data was acquired and the new status data was acquired from the difference between the second status sheet print job completion count from the printer 4 and the value already stored in the second print job completion count storage unit 25. The execution status detector 27 can also detect completion of a specific second status sheet print job from the difference between the second status sheet print job command count kept by the computer 2 and the second status sheet print job completion count from the printer 4.

In the example described above the computer 2 can detect if a print job was completed in the period between when the previous status data was acquired and when the current status data was acquired based on the newly received print job completion counts and the previously received print job completion counts. Based on the print job completion counts from the printer 4 and the print job command counts kept by the computer 2, completion of a specific print job on the printer 4 can also be detected from the computer 2. Because the computer 2 can know the execution status of a print job without individually querying the printer 4 about a specific print job, the number of communication transactions between the computer 2 and printer 4 is not increased to detect completion of a print job.

Note that a status sheet print job as used herein can be two or more types, including printing receipts and forms, for example. In this case there are accordingly two or more parts for storing and counting the print job counts.

When the execution status detector 27 detects the print job execution status in a regular interval in the example described above, the test coupon print controller 28 detects if there was a change between the print job completion counts from the printer 4 and the values already stored in the first to third print job completion count storage units 24 to 26 corresponding to the print job completion counts, and instructs the printer 4 to execute a coupon print job for printing a test coupon if a change appears in the first status sheet print job completion count. As a result, the test coupon print controller 28 can quickly detect completion of the first status sheet print job without querying the printer 4 about completion of the first status sheet print job. The printer 4 can therefore be instructed to execute the coupon print job for test printing without delay. In addition, because a change in the print job completion count does not appear in the first status sheet print job completion count if the first status sheet print job is cancelled by the printer 4, sending a coupon print job for test printing from the test coupon print controller 28 to the printer 4 in such situations can be avoided.

Note that a configuration in which the execution status detector 27 sends a coupon print job for printing a test coupon to the printer 4 when the execution status detector 27 detects completion of the first status sheet print job in the regular interval from the difference between the first status sheet print job completion count from the printer 4 and the value already stored in the first print job completion count storage unit 24 is also conceivable. In this configuration the test coupon print controller 28 may be omitted.

The invention can be implemented in digital electronic circuitry, or in computer hardware, firmware, software, or in combinations thereof. The invention can be implemented in a computer program tangibly embodied in a non-transitory machine-readable or computer readable media for execution by a programmable processor or computer. Computer readable media may include, for example, diskettes, compact disks (CDs), DVDs, solid-state memory devices, and the like While the invention has been described in conjunction with several specific embodiments, it is evident to those skilled in the art that many further alternatives, modifications and variations will be apparent in light of the foregoing description. Thus, the invention described herein is intended to embrace all such alternatives, modifications, applications and variations as may fall within the spirit and scope of the appended claims.

What is claimed is:

1. A control method for a printer system having a printer and a computer communicably connected, comprising steps of: executing, by the printer, print jobs including a coupon print job related to specific product information received from the computer, each print job including at least a first print job that accomplishes specific printing and a second print job that accomplishes specific printing different from the first print job; storing, by the printer, a number of first print jobs that finished printing as a first print job completion count, and storing a number of second print jobs that finished printing as a second print job completion count; determining, by the printer, when a print job is completed and if the print job that finished printing is the first print job or the second print job, and incrementing the first print job completion count and storing an updated first print job completion count when it is determined that the completed print job is the first print job, and incrementing the second print job completion count and storing an updated second print job completion count when it is determined that the completed print job is the second print job;

referencing, by the printer, stored information, and sending, by the printer, status data indicating a state of the printer and including the updated first print job completion count and the updated second print job completion count to the computer when a status data request is received from the computer; counting, by the computer, the number of sent first print jobs as a first print job command count each time a first print job is sent, and counting, by the computer, the number of sent second print jobs as a second print job command count each time a second print job is sent; storing, by the computer, the received print job completion count; comparing, by the computer when the print job completion count is received, the received print job completion count with the print job completion count already stored by the computer, detecting a specific print job that finished printing on the printer, updating the print job completion count, and storing the updated print job completion count; and comparing, by the computer, at least the first print job completion count and the first print job command count to detect first print jobs that finished printing on the printer, and comparing, by the computer, at least the second print job completion count and the second print job command count to detect second print jobs that finished printing on the printer.

2. The control method for a printer system described in claim 1, wherein: the first print job is for test printing on the printer.

3. A printer system comprising at least one printer and a computer communicably connected to the printer; the printer including a communication unit that communicates with the computer, a print control unit that executes print jobs including a coupon print job related to specific product information received from the computer, each print job including at least a first print job that accomplishes specific printing and a second print job that accomplishes specific printing different from the first print job, a storage unit including at least a first storage unit that stores a number of first print jobs that finished printing as a first print job completion count, and a second storage unit that stores a number of second print jobs that finished printing as a second print job completion count, and a status management unit including an evaluation unit that determines when printing a print job is completed by the print control unit, and if the print job that finished printing is the first print job or the second print job, and an update unit that increments the first print job completion count and updates the first storage unit to an updated first print job completion count when the first print job is determined and increments the second print job completion count and updates the second storage unit to an updated second print job completion count when the second print job is determined, the communication unit referencing at least the first storage unit and the second storage unit, and sending status data indicating a state of the printer and including the updated first print job completion count and the updated second print job completion count to the computer when a status data request is received from the computer; and the computer including a print job command counting unit that counts at least the number of sent first print jobs as a first print job command count each time a first print job is sent, and counts the number of sent second print jobs as a second print job command count each time a second print job is sent, a print job completion count storage unit that stores the received print job completion count, and a status detection unit that, when the print job completion count is received, compares the received print job completion count with the print job completion count already stored in the print job completion count storage unit and detects a specific print job that finished printing on the printer, and updates the print job completion count storage unit to the received print job completion count, wherein the status detection unit compares at least the first print job completion count and the first print job command count to detect first print jobs that finished printing on the printer, and compares at least the second print job completion count and the second print job command count to detect second print job that finished printing on the printer.

4. The printer system described in claim 3, wherein: the first print job is for test printing on the printer.

5. A tangible, non-transitory computer-readable medium embodying program instructions executable by a computer, the media including instructions for performing the method of claim 1.

6. A tangible, non-transitory computer-readable medium embodying program instructions executable by a computer, the media including instructions for performing the method of claim 2.

* * * * *